US012327944B2

(12) United States Patent
Liu et al.

(10) Patent No.: US 12,327,944 B2
(45) Date of Patent: Jun. 10, 2025

(54) CONNECTOR ASSEMBLY WITH HIGHER SPACE UTILIZATION

(71) Applicant: DONGGUAN LUXSHARE TECHNOLOGIES CO., LTD, Dongguan (CN)

(72) Inventors: Xiaogang Liu, Dongguan (CN); Rongzhe Guo, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 345 days.

(21) Appl. No.: 17/873,642

(22) Filed: Jul. 26, 2022

(65) Prior Publication Data

US 2023/0038794 A1 Feb. 9, 2023

(30) Foreign Application Priority Data

Aug. 3, 2021 (CN) ......................... 202121801823.6

(51) Int. Cl.
*H01R 12/72* (2011.01)
*H01R 12/71* (2011.01)
*H01R 12/73* (2011.01)

(52) U.S. Cl.
CPC ......... *H01R 12/721* (2013.01); *H01R 12/714* (2013.01); *H01R 12/732* (2013.01)

(58) Field of Classification Search
CPC .. H01R 12/721; H01R 12/714; H01R 12/732; H01R 13/405; H01R 13/514; H01R 13/6587; H01R 13/6471
USPC .......................................................... 439/637
See application file for complete search history.

(56) References Cited

U.S. PATENT DOCUMENTS

| | | | | |
|---|---|---|---|---|
| 10,965,062 | B1 * | 3/2021 | Miller | H05K 1/0218 |
| 11,183,796 | B2 | 11/2021 | Song et al. | |
| 2003/0220019 | A1 * | 11/2003 | Billman | H01R 13/6587 439/607.07 |
| 2014/0273557 | A1 * | 9/2014 | Cartier, Jr. | H01R 12/724 439/78 |

* cited by examiner

*Primary Examiner* — Gary F Paumen
(74) *Attorney, Agent, or Firm* — Birch, Stewart, Kolasch & Birch, LLP

(57) ABSTRACT

A connector assembly includes a card connector and a first backplane connector. The card connector includes a first terminal module, a second terminal module and a circuit board card. The circuit board card connects the first terminal module and the second terminal module to form a receiving cavity. The first backplane connector is received in the receiving cavity. The present disclosure can make full use of space to improve space utilization of the connector assembly.

18 Claims, 6 Drawing Sheets

CONNECTOR ASSEMBLY WITH HIGHER SPACE UTILIZATION

CROSS-REFERENCE TO RELATED APPLICATION

This patent application claims priority of a Chinese Patent Application No. 202121801823.6, filed on Aug. 3, 2021 and titled "CONNECTOR ASSEMBLY", the entire content of which is incorporated herein by reference.

TECHNICAL FIELD

The present disclosure relates to a connector assembly, which belongs to a technical field of connectors.

BACKGROUND

Some electrical systems often use orthogonal connectors to interconnect two circuit boards with each other. In some applications, the circuit boards are oriented orthogonal to each other. Typically, the orthogonal connector include a first connector mounted on a first circuit board and a second connector mounted on a second circuit board. The first connector and the second connector are matched and connected to realize the connection between the first circuit board and the second circuit board. The first circuit board and the second circuit board are disposed perpendicular to each other. However, the existing orthogonal connector occupies a relatively large space, resulting in low space utilization in the electrical system.

SUMMARY

An object of the present disclosure is to provide a connector assembly with higher space utilization.

In order to achieve the above object, the present disclosure adopts the following technical solution: a connector assembly, including: a card connector including a first terminal module, a second terminal module and a circuit board card, the circuit board card being connected to the first terminal module and the second terminal module so as to jointly form a receiving cavity; and a first backplane connector received in the receiving cavity.

In order to achieve the above object, the present disclosure adopts the following technical solution: a connector assembly, including: a card connector including a first terminal module, a second terminal module parallel to the first terminal module, and a circuit board card erected on the first terminal module and the second terminal module; the first terminal module and the second terminal module being electrically connected to the circuit board card; the first terminal module, the second terminal module and the circuit board card jointly forming a receiving cavity; a first backplane connector received in the receiving cavity.

Compared with the prior art, the first terminal module and the second terminal module of the present disclosure are lapped with the circuit board to form a receiving cavity, and the first backplane connector is received in the receiving cavity. As a result, it can make full use of space to improve space utilization of the connector assembly.

DETAILED DESCRIPTION

Figure 1:
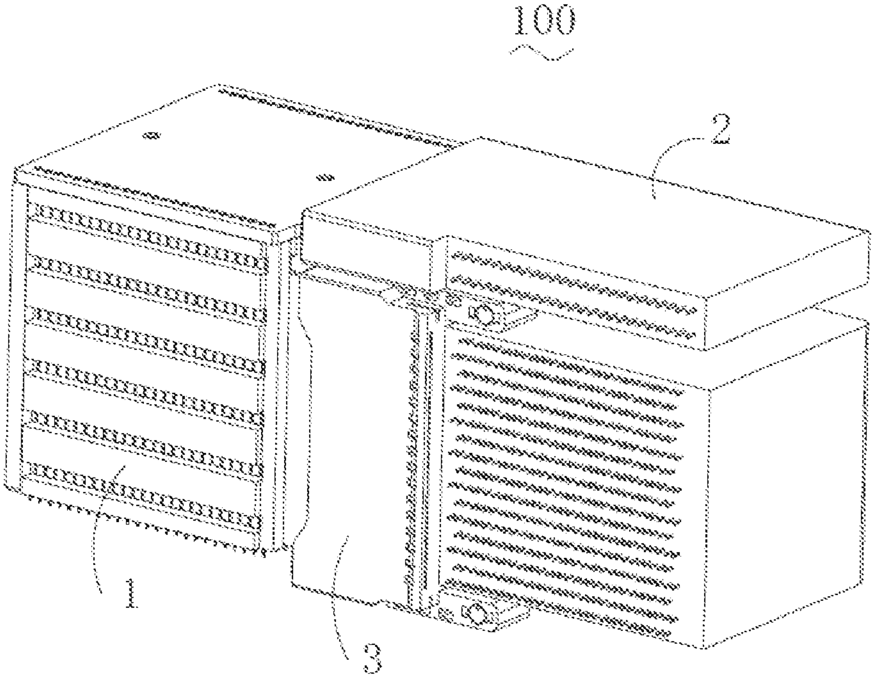
FIG. 1 is a perspective schematic view of a connector assembly in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 9, the present disclosure discloses a connector assembly 100 including a card connector 1, a plug-in card connector 2 and an orthogonal connector 3. The card connector 1 includes a first terminal module 11, a second terminal module 12 and a circuit board card 13. The circuit board card 13 connects the first terminal module 11 and the second terminal module 12. The circuit board card 13 is lapped with the first terminal module 11 and the second terminal module 12 to jointly form a U-shaped configuration with a receiving cavity 14. An end of the circuit board card 13 is inserted into the plug-in card connector 2. The orthogonal connector 3 is partly received in the receiving cavity 14 and partly arranged in parallel with the plug-in card connector 2, thereby making full use of a peripheral space of the orthogonal connector 3 to improve the space utilization of the connector assembly 100.

Figure 2:
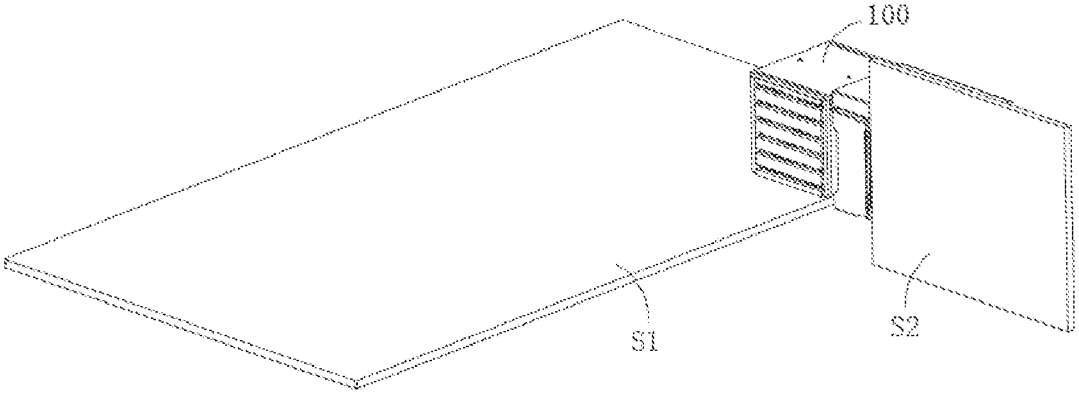
FIG. 2 is a perspective schematic view of the connector assembly of FIG. 1 installed on a first circuit board and a second circuit board.
Figure 3:
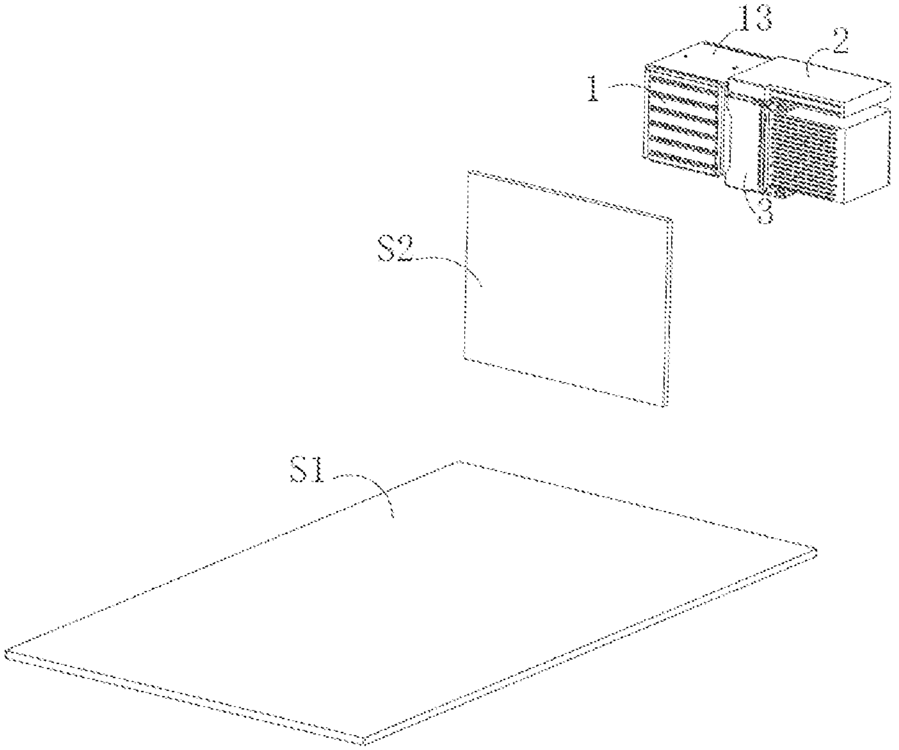
FIG. 3 is a partially exploded perspective view of FIG. 2.
Figure 4:
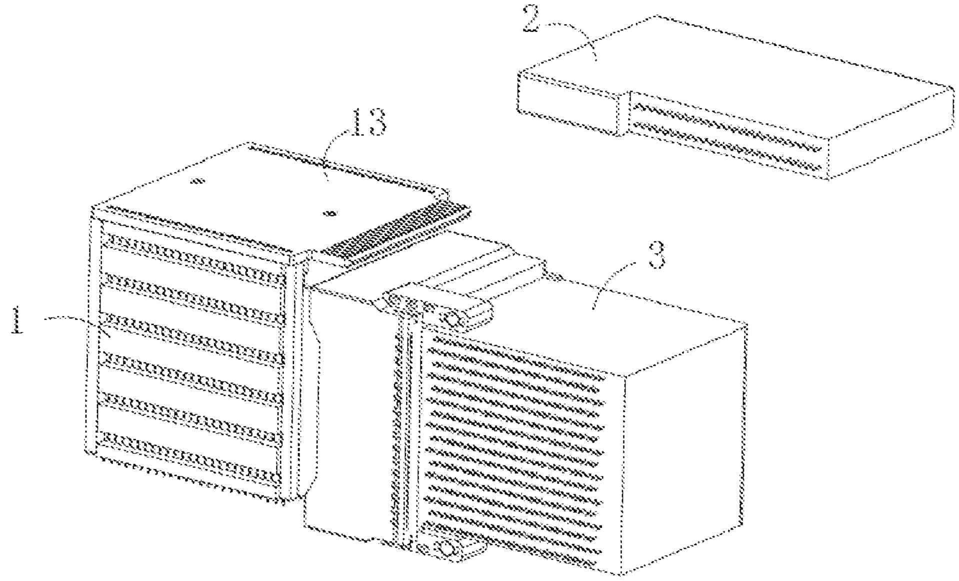
FIG. 4 is a partially exploded perspective view of FIG. 1.
Figure 5:
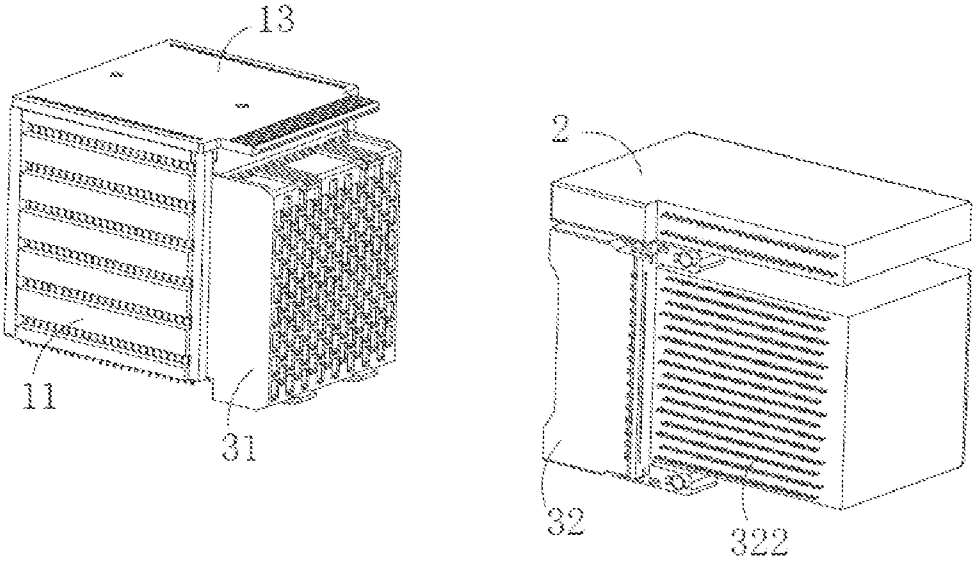
FIG. 5 is another partial perspective exploded view of FIG. 1.
Figure 6:
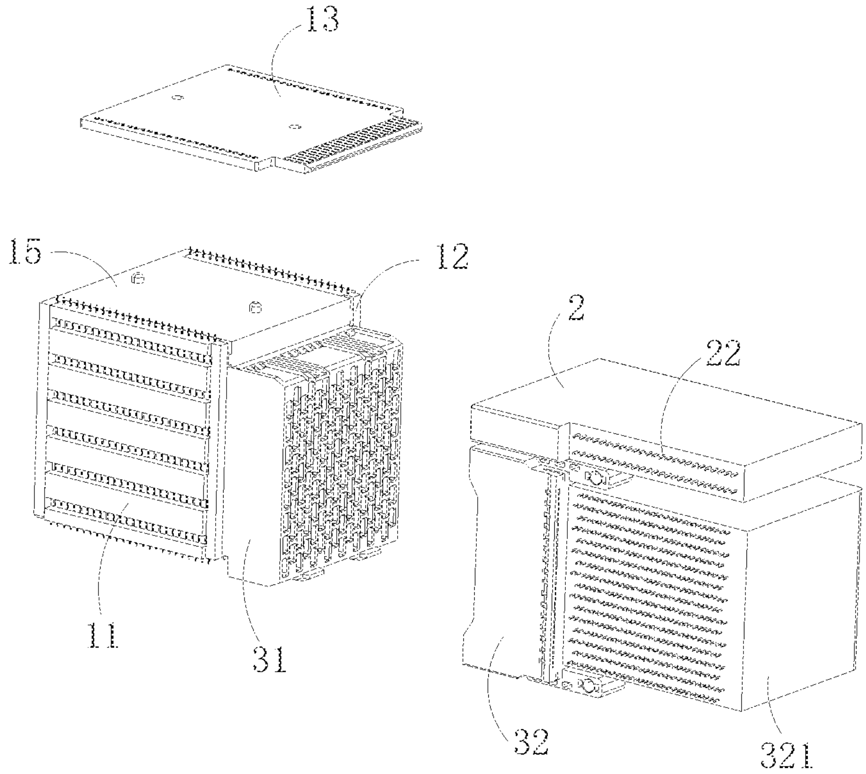
FIG. 6 is a further partial perspective exploded view of FIG. 5.
Figure 7:
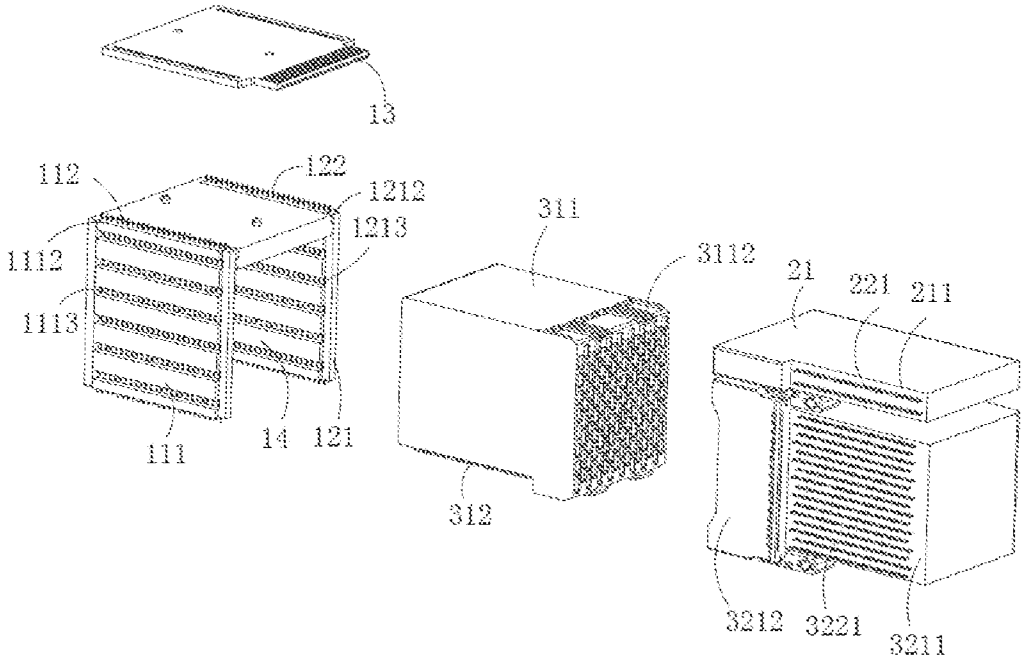
FIG. 7 is a further partial perspective exploded view of FIG. 6.
Figure 8:
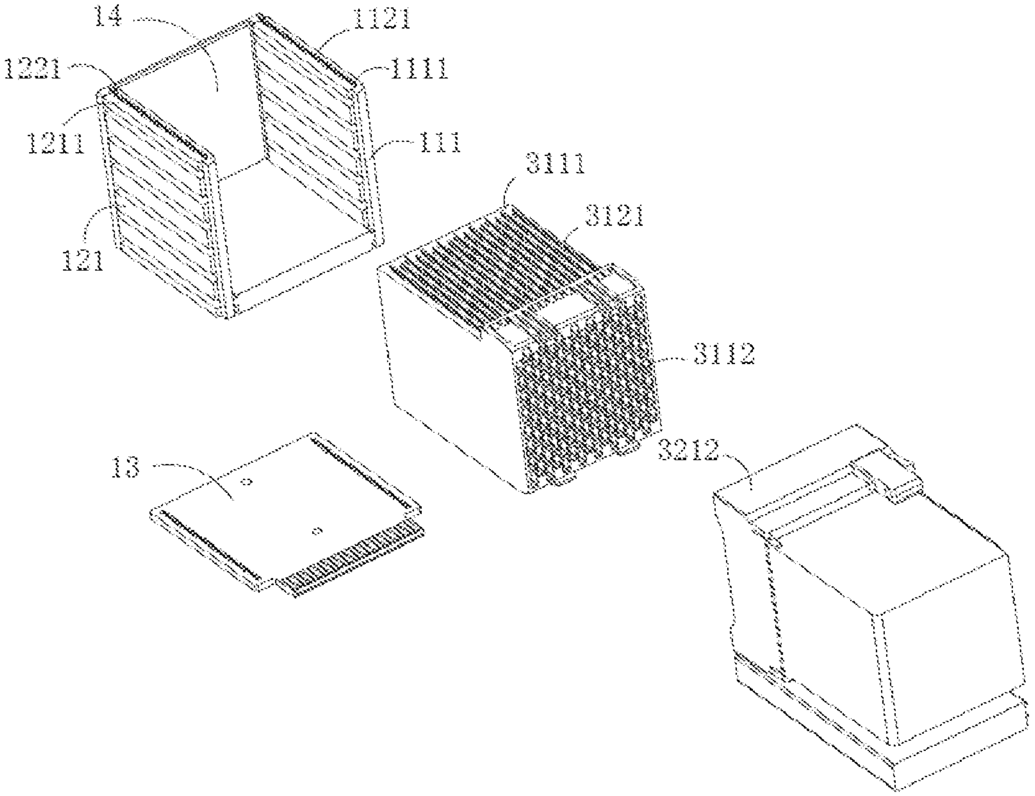
FIG. 8 is a partially exploded perspective view of FIG. 7 from another angle.
Figure 9:
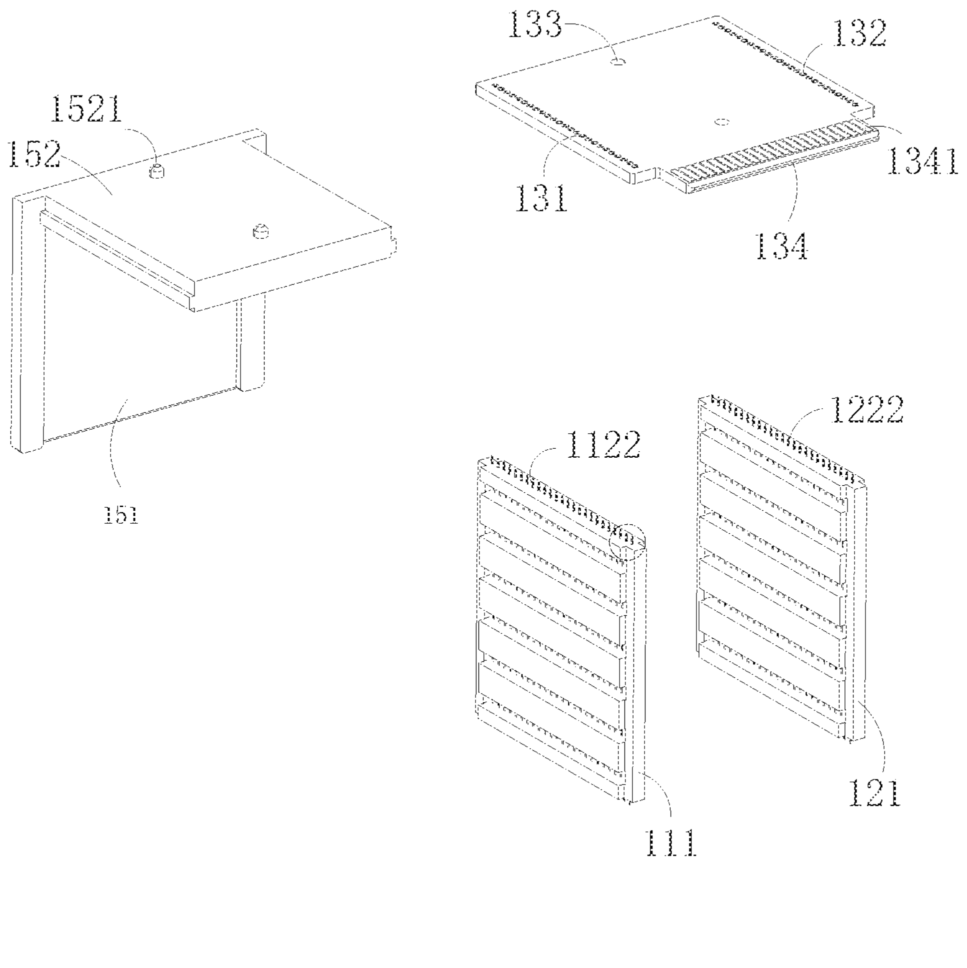
FIG. 9 is a partially exploded perspective view of a card connector in FIG. 1.

Referring to FIGS. 2 and 3, the connector assembly 100 is mounted on the first circuit board S1 and the second circuit board S2. The orthogonal connector 3 includes a first backplane connector 31 and a second backplane connector 32 for mating with the first backplane connector 31. The card connector 1 and the first backplane connector 31 are mounted on the first circuit board S1. The plug-in card connector 2 and the second backplane connector 32 are mounted on the second circuit backplane S2. The first backplane connector 31 is received in the receiving cavity 14. In the present embodiment, the first backplane connector 31 and the second backplane connector 32 are mated in an orthogonal manner. The first circuit board S1 is perpendicular to the second circuit board S2. The circuit board card 13 is parallel to the first circuit board S1.

Figure 10:
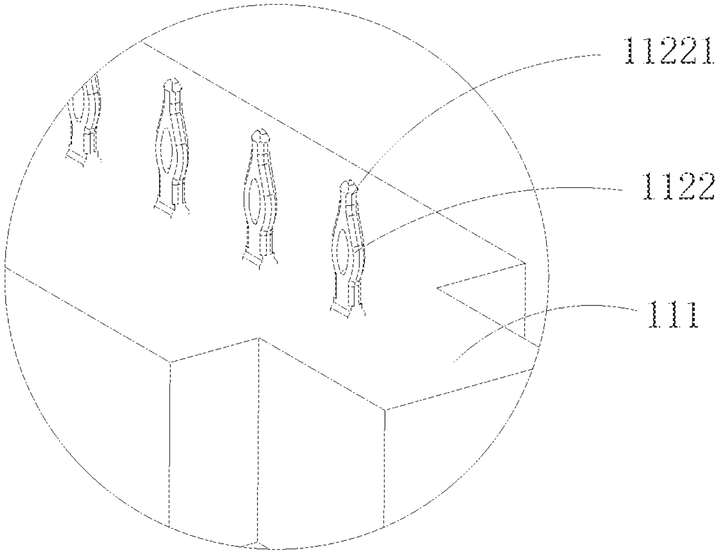
FIG. 10 is an enlarged schematic view of a circled part in FIG. 9.

Referring to FIGS. 1 to 9, the first terminal module 11 and the second terminal module 12 of the card connector 1 are spaced apart and support the circuit board card 13. The circuit board card 13 is erected on the first terminal module 11 and the second terminal module 12. The circuit board card 13 is disposes in parallel with the first circuit board S1. The first terminal module 11 and the second terminal module 12 are symmetrically arranged. The first terminal module 11 includes a plate-shaped first insulating portion 111 and a plurality of first pressing terminals 112 fixed in the first insulating portion 111. In the present embodiment, the first insulating portion 111 is molded together with the first pressing terminals 112 by injection molding. In other embodiments, the first pressing terminals 112 may also be fixed in the first insulating portion 111 in a post-assembly manner. After the card connector 1 is assembled on the first circuit board S1, the first insulating portion 111 is vertically arranged relative to the first circuit board S1. The first insulating portion 111 includes a first bottom end 1111 contacting the first circuit board S1 and a first top end 1112 disposed opposite to the first bottom end 1111. Each first pressing terminal 112 includes a first bottom pressing pin 1121 protruding beyond the first bottom end 1111 and a first top pressing pin 1122 protruding beyond the first top end 1112. In the present embodiment, the first bottom pressing pins 1121 are pressed into corresponding connection holes (not shown) of the first circuit board S1, and the first pressing pins 1122 are pressed into the first holes 131 of the circuit board card 13. Each of the first bottom pressing pins 1121 and the first top pressing pins 1122 include a fish-eye structure, as shown in FIG. 10. The first pressing pins 1122 are pressed into the first holes 131 of the circuit board card 13 through the fish-eye structures 11221.

The second terminal module 12 includes a plate-shaped second insulating portion 121 and a plurality of second pressing terminals 122 fixed in the second insulating portion 121. In this embodiment, the second insulating portion 121 is molded together with the second press terminals 122 by injection molding. In other embodiments, the second pressing terminal 122 may also be fixed in the second insulating portion 121 in a post-assembly manner. After the card connector 1 is assembled on the first circuit board S1, the second insulating portion 121 is vertically arranged relative to the first circuit board S1. The second insulating portion 121 includes a second bottom end 1211 contacting the first circuit board S1 and a second top end 1212 disposed opposite to the second bottom end 1211. Each second pressing terminal 122 includes a second bottom pressing pin 1221 protruding beyond the second bottom end 1211 and a second top pressing pin 1222 protruding beyond the second top end 1212. In this embodiment, the second bottom pressing pins 1221 are pressed into corresponding connection holes (not shown) of the first circuit board S1. The second top pressing pins 1222 are pressed into the second holes 132 of the circuit board card 13. Each of the second bottom pressing pins 1221 and the second top pressing pins 1222 includes a fish-eye structure. The second bottom pressing pins 1221 and the second top pressing pins 1222 are pressed into the corresponding holes of the second circuit board S2 and the circuit board card 13 through the fish-eye structures. In this embodiment, the first bottom pressing pins 1121 and the second bottom pressing pins 1221 are inserted into the first circuit board S1 by pressing. The electrical connection is achieved by the first bottom pressing pins 1121 and the second bottom pressing pins 1221 elastically contacting the first circuit board S1. In other embodiments, welding can also be used for electrical connection.

In some embodiments, a plurality of first grooves 1113 are respectively provided on opposite sides of the first insulating portion 111. The first grooves 1113 on the opposite sides are symmetrically arranged. Correspondingly, a plurality of second grooves 1213 are respectively provided on opposite sides of the second insulating portion 121. The second grooves 1213 on the opposite sides are symmetrically arranged. In some embodiments, parts of the first pressing terminals 112 are exposed from the first grooves 1113. Parts of the second pressing terminals 122 are exposed from the second grooves 1213.

The card connector 1 also includes an inverted L-shaped bracket 15. The bracket 15 includes a rear wall 151 and a top wall 152 extending from an end of the rear wall 151. The rear wall 151 and the top wall 152 are perpendicular to each other. When the card connector 1 is mounted on the first circuit board S1, the rear wall 151 is vertically mounted on the first circuit board S1, and the top wall 152 is suspended in parallel to the first circuit board S1. The first terminal module 11 and the second terminal module 12 are disposed on opposite sides of the bracket 15. The top wall 152 includes at least one positioning post 1521 protruding from a top surface of the top wall 152 for positioning the circuit board card 13. In this way, the first terminal module 11, the second terminal module 12, the circuit board card 13 and the bracket 15 are enclosed with the first circuit board S1 to form a receiving cavity 14. A plurality of first holes 131 and a plurality of second holes 132 are opened on opposite sides of the circuit board card 13, respectively. The circuit board card 13 defines at least one positioning hole 133 corresponding to the positioning post 1521, and the positioning post 1521 is inserted into the positioning hole 133. In this embodiment, the circuit board card 131 defines two positioning holes 133 at intervals. Correspondingly, the top wall 152 includes two protruding positioning posts 1521. An end of the circuit board card 131 is configured as a plug-in end 134. Specifically, the circuit board card 131 is installed on the top wall 152 and protrudes beyond the top wall 152 toward an end of an opening of the receiving cavity 14 to be set as a plug-in end 134. A plurality of conductive pads 1341 are arranged on upper and lower sides of the plug-in end 134, respectively. The conductive pads 1341 are used to realize electrical connection with the plug-in card connector 2.

Referring to FIGS. 1 to 8, the plug-in card connector 2 includes a main body 21 and a plurality of plug-in terminals 22 fixed in the main body 21. The main body 21 is formed with an insertion slot (not shown in the drawing) for receiving the plug-in end 134 and a mounting end 211 disposed perpendicular to a side where the insertion slot is located. Each plug-in terminal 22 includes a contact portion (not shown in the drawing) extending into the insertion slot and a plug-in pin 221 protruding beyond the mounting end 211. The plug-in pin 221 is fixed to the second circuit board S2.

Referring to FIGS. 1 to 7, the first backplane connector 31 of the orthogonal connector 3 includes a first housing 311 and a plurality of first backplane terminals 312 assembled in the first housing 311. The first housing 311 includes a bottom surface 3111 and a first mating end 3112 located outside of the receiving cavity 14. The bottom surface 3111 is parallel to the first circuit board S1. Each first backplane terminal 312 includes a first backplane pin 3121 protruding beyond the bottom surface 3111. The first backplane connector 31 is partially received in the receiving cavity 14. The bottom surface 3111 is located in the receiving cavity 14. The first backplane pins 3121, the first bottom pressing pins 1121 and the second bottom pressing pins 1221 are arranged in an array and are all mounted to the first circuit board S1. The second backplane connector 32 includes a second housing 321 and a plurality of second backplane terminals 322 assembled in the second housing 321. The second housing 321 includes a side surface 3211 and a second mating end 3212. Each second backplane terminal 322 includes a second backplane pin 3221 protruding beyond the side surface 3211. The side surface 3211 is arranged parallel to the second circuit board S2. The second backplane pins 3221 and the plug-in pins 221 are arranged in an array and are both mounted to the second circuit board S2. The second mating end 3212 and the first mating end 3112 are mated with each other to realize the mating of the first backplane connector 31 and the second backplane connector 32, and realize the electrical connection of the first circuit board S1 and the second circuit board S2.

Referring to FIGS. 1 to 9, the card connector 1 is mounted to an edge of the first circuit board S1. The plug-in card connector 2 is connected to the circuit board card 13 and protrudes beyond the first circuit board S1. The first backplane connector 31 of the orthogonal connector 3 is installed in the receiving cavity 14 of the card connector 1 and located at the edge of the first circuit board S1. The second backplane connection 32 protrudes beyond the first circuit board S1. Both the card connector 1 and the first backplane connector 31 are mounted to the first circuit board S1. The card connector 1 is arranged around the first backplane connector 31. Both the plug-in card connector 2 and the second backplane connector 32 are mounted to the second circuit board S2. The plug-in card connector 2 and the second backplane connector 32 are stacked relative to the first circuit board S1 and are arranged side by side on the second circuit board S2. In this way, the space can be fully utilized and the space utilization can be improved.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A connector assembly, comprising:

a card connector comprising a first terminal module, a second terminal module and a circuit board card, the circuit board card being connected to the first terminal module and the second terminal module so as to jointly form a receiving cavity; and a first backplane connector received in the receiving cavity;

wherein the connector assembly further comprises a plug-in card connector and an orthogonal connector, the orthogonal connector comprises the first backplane connector and a second backplane connector, the second backplane connector and the plug-in card connector are disposed in parallel, an end of the circuit board card is inserted into the plug-in card connector, the first backplane connector and the second backplane connector are mated in an orthogonal manner.

2. The connector assembly according to claim 1, wherein the connector assembly is adapted for being mounted on a first circuit board and a second circuit board, the card connector and the first backplane connector are mounted on the first circuit board, the plug-in card connector and the second backplane connector are mounted on the second circuit board, and the first circuit board is perpendicular to the second circuit board.

3. The connector assembly according to claim 1, wherein the first backplane connector comprises a first housing and a plurality of first backplane terminals assembled in the first housing, the first housing comprises a first mating end; wherein the second backplane connector comprises a second housing and a plurality of second backplane terminals assembled in the second housing, the second housing comprises a second mating end; and wherein the first mating end is opposite to the second mating end, the first backplane terminals are adapted to be fixed to the first circuit board, and the second backplane terminals are adapted to be fixed to the second circuit board.

4. The connector assembly according to claim 1, wherein the first terminal module and the second terminal module are spaced apart and support the circuit board card; and wherein the circuit board card is erected on the first terminal module and the second terminal module.

5. The connector assembly according to claim 4, wherein the first terminal module comprises a plate-shaped first insulating portion and a plurality of first pressing terminals fixed in the first insulating portion, each first pressing terminal comprises a first bottom pressing pin and a first top pressing pin protruding beyond the first insulating portion;

wherein the second terminal module comprises a plate-shaped second insulating portion and a plurality of second pressing terminals fixed in the second insulating portion, each second pressing terminal comprises a second bottom pressing pin and a second top pressing pin protruding beyond the second insulating portion;

wherein the first bottom pressing pins and the second bottom pressing pins are pressed into the first circuit board, and the first top pressing pins and the second top pressing pins are pressed into the circuit board card; and wherein the circuit board card defines a plurality of first holes and a plurality of second holes opened on opposite sides of the circuit board card, respectively; and the first top pressing pins are pressed into the first holes, and the second top pressing pins are pressed into the second holes.

6. A connector assembly, comprising:

a card connector comprising a first terminal module, a second terminal module and a circuit board card, the circuit board card being connected to the first terminal module and the second terminal module so as to jointly form a receiving cavity; and a first backplane connector received in the receiving cavity;

wherein the card connector further comprises a bracket, the bracket comprises a rear wall and a top wall extending from an end of the rear wall, the rear wall and the top wall are disposed perpendicular to each other, the first terminal module and the second terminal module are disposed on opposite sides of the bracket, and the circuit board card is positioned on the top wall.

7. The connector assembly according to claim 6, wherein the circuit board card defines a positioning hole, the top wall comprises a positioning post inserted in the positioning hole.

8. The connector assembly according to claim 6, further comprising a plug-in card connector, an end of the circuit board card protruding beyond the top wall is set as a plug-in end, a plurality of conductive pads are disposed on upper and lower sides of the plug-in end, and the conductive pads are electrically connected with the plug-in card connector.

9. The connector assembly according to claim 8, wherein the plug-in card connector comprises a main body and a plurality of plug-in terminals fixed in the main body, the main body is formed with an insertion slot for receiving the plug-in end, and each plug-in terminal comprises a plug-in pin protruding beyond the main body.

10. A connector assembly, comprising:

a card connector comprising a first terminal module, a second terminal module parallel to the first terminal module, and a circuit board card erected on the first terminal module and the second terminal module; the first terminal module and the second terminal module being electrically connected to the circuit board card; the first terminal module, the second terminal module and the circuit board card jointly forming a receiving cavity; and a first backplane connector received in the receiving cavity;

the first terminal module comprises a plate-shaped first insulating portion and a plurality of first pressing terminals fixed in the first insulating portion, each first pressing terminal comprises a first bottom pressing pin and a first top pressing pin protruding beyond the first insulating portion;

wherein the second terminal module comprises a plate-shaped second insulating portion and a plurality of second pressing terminals fixed in the second insulating portion, each second pressing terminal comprises a second bottom pressing pin and a second top pressing pin protruding beyond the second insulating portion;

wherein the first bottom pressing pins and the second bottom pressing pins are pressed into the first circuit board, and the first top pressing pins and the second top pressing pins are pressed into the circuit board card; and wherein the circuit board card defines a plurality of first holes and a plurality of second holes opened on opposite sides of the circuit board card, respectively; and the first top pressing pins are pressed into the first holes, and the second top pressing pins are pressed into the second holes.

11. The connector assembly according to claim 10, further comprising a plug-in card connector and an orthogonal connector, the orthogonal connector comprising the first backplane connector and a second backplane connector, an end of the circuit board card being inserted into the plug-in card connector, the first backplane connector and the second backplane connector being mated in an orthogonal manner.

12. The connector assembly according to claim 11, further comprising a first circuit board and a second circuit board, the card connector and the first backplane connector being mounted on the first circuit board, the plug-in card connector and the second backplane connector being mounted on the second circuit board, the first circuit board being perpendicular to the second circuit board.

13. The connector assembly according to claim 11, wherein the first backplane connector comprises a first housing and a plurality of first backplane terminals assembled in the first housing; wherein the second backplane connector comprises a second housing and a plurality of second backplane terminals assembled in the second housing; and wherein the first backplane terminals are adapted to be fixed to the first circuit board, and the second backplane terminals are adapted to be fixed to the second circuit board.

14. The connector assembly according to claim 10, wherein the first terminal module and the second terminal module are spaced apart and support the circuit board card.

15. The connector assembly according to claim 10, wherein the card connector further comprises a bracket, the bracket comprises a rear wall and a top wall extending from an end of the rear wall, the rear wall and the top wall are disposed perpendicular to each other, the first terminal module and the second terminal module are disposed on opposite sides of the bracket, and the circuit board card is positioned on the top wall.

16. The connector assembly according to claim 15, wherein the circuit board card defines a positioning hole, the top wall comprises a positioning post inserted in the positioning hole.

17. The connector assembly according to claim 15, further comprising a plug-in card connector, an end of the circuit board card protruding beyond the top wall is set as a plug-in end, a plurality of conductive pads are disposed on upper and lower sides of the plug-in end, and the conductive pads are electrically connected with the plug-in card connector.

18. The connector assembly according to claim 17, wherein the plug-in card connector comprises a main body and a plurality of plug-in terminals fixed in the main body, the main body is formed with an insertion slot to receive the plug-in end, and each plug-in terminal comprises a plug-in pin protruding beyond the main body.

* * * * *